United States Patent [19]

Hampl, Jr.

[11] 4,061,505

[45] Dec. 6, 1977

[54] RARE-EARTH-METAL-BASED THERMOELECTRIC COMPOSITIONS

[75] Inventor: Edward F. Hampl, Jr., St. Paul, Minn.

[73] Assignee: Minnesota Mining and Manufacturing Company, St. Paul, Minn.

[21] Appl. No.: 406,277

[22] Filed: Oct. 15, 1973

Related U.S. Application Data

[63] Continuation of Ser. No. 187,861, Oct. 8, 1971, abandoned, and a continuation-in-part of Ser. No. 36,131, May 11, 1970, abandoned.

[51] Int. Cl.$^2$ .............................................. H01G 1/18
[52] U.S. Cl. ................................ 136/238; 136/236 R; 423/263; 423/508; 252/62.3 T
[58] Field of Search ................ 136/236, 238; 423/263, 423/508, 509; 252/62.3 T, 62.3 V

[56] References Cited

U.S. PATENT DOCUMENTS

| 2,397,756 | 4/1946 | Schwarz ............................... 136/238 |
| 3,129,056 | 4/1964 | Muir ..................................... 136/236 |
| 3,371,041 | 2/1968 | Holtzberg et al. .................... 423/263 |

FOREIGN PATENT DOCUMENTS

| 106,379 | 1/1939 | Australia ............................. 136/238 |
| 710,253 | 5/1965 | Canada ................................ 136/238 |

OTHER PUBLICATIONS

Chem. Abstracts, vol. 70, 1969, p. 488, Abstract No. 102581c.
Rare Earth Research, The Macmillan Co., N.Y., 1961, pp. 232–240.

*Primary Examiner*—Harvey E. Behrend
*Attorney, Agent, or Firm*—Cruzan Alexander; Donald M. Sell; Roger R. Tamte

[57] ABSTRACT

N-type thermoelectric compositions based on rare-earth metal selected from gadolinium and erbium and chalcogen selected from selenium and tellurium.

5 Claims, No Drawings

RARE-EARTH-METAL-BASED THERMOELECTRIC COMPOSITIONS

REFERENCE TO RELATED APPLICATION

This is a continuation, of application Ser. No. 187,861 filed Oct. 8, 1971, now abandoned; and is a continuation-in-part of copending application Ser. No. 36,131, filed May 11, 1970, now abandoned.

The unique value as thermoelectric legs in thermoelectric generators of the copper chalcogenides and copper-silver chalcogenides taught in Hampl, Ser. No. 635,948 arises in part because these compositions are useful to high temperatures such as 1000° C. That is, thermoelectric conversion efficiency for a thermoelectric leg in a thermoelectric generator (the ratio of electric energy output to thermal energy input) is greatly dependent upon the temperatures of the hot and cold junctions of the legs as shown by the following Ioffe expression for efficiency, $$\text{Efficiency} = \left(\frac{T_h - T_c}{T_h}\right) \frac{\sqrt{1 + \bar{Z}(T_h + T_c)/2} - 1}{\sqrt{1 + \bar{Z}(T_h + T_c)/2} + T_c/T_h},$$

in which $\bar{Z}$ is the average value of the thermoelectric figure of merit $Z$ of the material of the leg in the temperature interval $T_c$ to $T_h$, and the latter are the absolute temperatures of the cold and hot junctions of the leg, respectively. This expression includes the Carnot factor, $(T_h - T_c/T_h)$, and it will be seen that efficiency is greatly increased when $T_h$ is increased.

The problem is that there has been no N-type composition useful to high temperatures that would be an optimum match for these P-type copper and copper-silver chalcogenides, and accordingly, thermoelectric generators making full use of the P-type compositions have not been made. For example, N-type thermoelectric compositions of silicon and germanium are useful to high temperatures, but their Seebeck and resistivity characteristics are so different from those of the described P-type compositions that legs of the two materials should have different geometrics (different ratios of length to cross-sectional area). Further, the totally different chemical nature of the copper and copper-silver chalcogenides, on the one hand, and N-type silicon germanide, which is typically doped with phosphorus, on the other hand, raises a problem of inherent instability. In contrast to this tendency toward instability, the described P-type compositions when operated by themselves are of unusual stability at high temperatures.

The best known material to use with the described P-type compositions is N-type lead telluride, but this composition is not useful above temperatures of about 500°–550° C. The maximum temperature for the hot junction of the N-type leg, of course, determines the maximum hot-junction temperature for the P-type leg. The result is that, with the best known N-type material for the P-type compositions, the wide useful temperature range of the P-type compositions is only half exploited.

The present invention provides thermoelectric compositions that lay a basis for more optimum use of the described P-type compositions. Briefly, these new compositions are defect-doped, mixed-valence, substantially single-phase, metal-excess sesquichalcogenides having a negative absolute Seebeck coefficient of more than 175 microvolts/°C at 500° C and consisting essentially of rare-earth metal selected from gadolinium and erbium and chalcogen selected from selenium and tellurium, with up to about 5 atomic-percent of the metal being replaced with yttrium, neodymium, praseodymium, cerium, or mixed-valence transition metals such as iron and up to 5 atomic percent of the chalcogen being replaced with sulfur or oxygen, and the ratio of chalcogen elements to metal elements being between about 1.42 and slightly less than 1.5 to 1.

The fact that the new compositions are "mixed-valence" compositions given an appropriate carrier concentration by "defect-doping" makes them like the described P-type copper and copper-silver chalcogenides. "Mixed-valence" compositions are compositions in which at least one of the ingredient elements (in this case the rare-earth metal) is capable of existing in the composition at two valence states. "Defect-doped" compositions form a nonstoichiometric lattice structure— having a small-percentage deficiency or excess of one or more elements of the composition—and these defects make certain electrons in the structure susceptible to thermal excitation to produce conductor electrons or holes. Thus, for the described P-type copper and copper-silver chalcogenides, the lattice is deficient in metal atoms, giving rise to acceptor energy levels that are near the valence energy band for the system. Thermal excitation of valence electrons to the acceptor energy levels produces holes which are the principal current carriers for P-type compositions. For the N-type compositions of this invention, excess metal atoms are included in the lattice structure, thereby producing donor energy levels, which in turn are easily achieved by valence electrons under thermal excitation to produce electrons that are the principal current carriers for the compositions. Additional characteristics of a defect-doped, mixed-valence composition are more fully described in the parent of this application, Ser. No. 36,131, which is incorporated herein by reference.

The Seebeck coefficient provides another useful description of the makeup of a composition of the invention on a microscopic or atomic scale, since the Seebeck coefficient is a function of the reduced Fermi level for the material. The reduced Fermi level is the Fermi level divided by the product of Boltzmann's constant (having a value of 86.3 ev/°C) and the absolute temperature of measurement. The Fermi level is essentially a measure of the chemical potential of the electrons in the composition, and that in turn is affected by the way atoms are distributed and arranged in the composition—for example, in the number, size, and composition of phases, crystal structure, etc. Compositions having an absolute Seebeck coefficient of 175 microvolts/°C or more have a desired distribution and arrangement of atoms.

The value of the new compositions for use with the described P-type copper chalcogenides and copper-silver chalcogenides arises from several facts. First, the new compositions are useful to very high temperatures, in fact, temperatures higher than the described P-type compositions. Further, since the new compositions and the described P-type compositions are both defect-doped and also because they have common chemical elements, chemical compatibility problems are reduced; for example, the primary vapor species from both legs is chalcogen, meaning that there will not be cross-promotion of the two legs. Also, because many of the new compositions have Seebeck coefficients and resistivities that are similar to those of the described P-type compositions in magnitude and in the rate at which they vary with temperature, and because the two compositions have similar thermal conductivities, the geometries of thermoelectric legs of the two compositions can be similar.

While others have investigated the thermoelectric properties of rare-earth-metal chalcogenides, insofar as is known none of this prior work has ever led to compositions of the present invention. For example, in one case (see Interim Scientific Report No. 2 by Battelle Memorial Institute under Contract No. AF 33 (616)-7321 to Wright-Patterson Air Force Base), gadolinium and selenium were reacted by a solid-vapor reaction procedure (in which the chalcogen is heated in one container to vaporize it, and the vapor is conducted to another container containing granulated rare-earth metal) to apparently form a metal-excess sesquiselenide, specifically a composition having the formula $GdSe_{1.46}$. However, as noted above, describing the kind and proportions of elements does not fully describe a composition, since the distribution and arrangement of atoms in the composition is critical to achieving efficient thermoelectric conversions. The values of Seebeck coefficient measured for the Battelle composition (pages 30 and 34 of the report) reveal that it was not a composition of the invention. Compositions of the invention have a negative absolute Seebeck coefficient at 500° C of at least 175 microvolts/°C, whereas the Battelle composition had a Seebeck coefficient of only 112 at about 500° C. It may be speculated that the solid-vapor method of preparation provided an undesirable distribution and arrangement of atoms in the Battelle composition, perhaps leaving a large second phase of GdSe at the grain boundaries, for example. Whatever the reason, the reported material was undesirable for use in thermoelectric conversions.

In another study of rare-earth-metal chalcogenides (see Final Report by Research Chemicals Division of Nuclear Corporation of America under Contract No. NObs-84088 to the Bureau of Ships, Navy Department; and Vickery, R.C. and Muir, H. M., Nature, Apr. 22, 1961, volume 190, page 336) several metal-excess rare-earth-metal sesquichalcogenides were prepared. However, it is again clear that the compositions made were not compositions of the present invention, since the electrical properties measured for the compositions are not consistent with compositions of the invention, the reported results were selfcontradictory and inconsistent, and the compositions were characterized as a mixture of a significant amounts of different compounds.

In summary, these initial surveys of rare-earth-metal chalcogenides did not reveal or suggest the existence of the compositions of the present invention. While some of the compositions prepared had proportions of elements nominally similar to those of compositions of the invention, those compositions exhibited properties significantly poorer than those sought by present-day thermoelectric researchers, and accordingly such researchers would have been led away from the present compositions.

DETAILED DESCRIPTION

To obtain nonstoichiometric substantially single-phase compositions of the invention, the ratio of chalcogen elements to metal elements in the compositions should be between about 1.42 to 1 and very slightly less than a stoichiometric ratio for a sesquichalcogenide, as 1.495 to 1. Preferably, this ratio is more than 1.47 to 1.

In addition, the ingredients should be reacted by a method that will minimize formation of a second phase. A preferred reaction method is to mix under a nonoxidizing atmosphere desired metal and chalcogen elements in subdivided form and heat them to cause them to react together. A problem with such a reaction is the disparity between the melting and boiling points of the chalcogen and the melting point of the rare-earth metals. For example, selenium melts at about 220° C and boils at about 630° C., while gadolinium melts at about 1400° C. To overcome this disparity, the reactants preferably undergo long-term low-temperature reactions, that is, reactions at temperatures less than the melting point of the rare-earth metal. Generally low-temperature reactions are performed at a temperature slightly above the melting point of the chalcogen, at a temperature slightly below the boiling point of the chalcogen, and at a temperature close to the melting point of the rare-earth metal. Additional low-temperature reactions may also be used. By "long-term" it is meant that the reactants are allowed to approximately reach equilibrium.

At the end of the first low-temperature reaction the reactants have changed from two separate powders to a single solid clinker-like material, the chalcogen having passed through a liquid phase to apparently become chemically bound to the rare-earth metal. In successive low-temperature reactions the chemical bonding between the rare-earth metal and chalcogen may change, and in a final reaction at a temperature above the melting point of the final composition, the elements become chemically bonded so that they will cool to a substantially single phase chalcogen-deficient sesquichalcogenide.

The reacted composition may then be formed into thermoelectric leg structures by methods that form a dense, uniform, substantially single-phase structure, preferably casting (which preferably is performed under a partial vacuum to remove gases) or hydrostatic extrusion as taught in my copending application, Ser. No. 156,194, or by other metal-forming processes such as powder-pressing and sintering. The metal-forming operation is preferably performed under a nonoxidizing atmosphere. The thermoelectric leg structure formed may be intended for use as a complete thermoelectric leg, or it may be intended for use as part of the length of a thermoelectric leg with one or more other segments of the leg bonded to it. The latter "segmenting" procedure is used when different kinds of material are more adapted for use at a particular temperature interval.

Any second phase or phases of material in compositions of the invention will generally appear at the edges of the crystal grains. The highest Seebeck coefficients are obtained in compositions of the invention when any second phase on the grain boundary is less than 1-2 microns in diameter, and when any second phase amounts to less than about 1 percent of the surface area of a sample as tested by an electron microprobe. However, satisfactory Seebeck coefficients above 175 are obtained even when the second phase occupies as much as 3-5 percent of the surface area of the sample.

The gadolinium selenide compositions, which have Seebeck coefficients and electrical resistivities quite similar to the described P-type compositions, are preferred compositions of the invention. The gadolinium tellurides and the erbium selenides and tellurides have quite good Seebeck coefficients that gradually increase with temperature, making these compositions useful where high voltage or power is important. Although the compositions of the invention consist principally of rare-earth metal selected from gadolinium and erbium and chalcogen selected from selenium and tellurium, it should be recognized that other elements can be included in the compositions without destroying, and in some combinations to increase, useful thermoelectric conversion properties. For example, part of the gadolinium or erbium may be replaced with yttrium, neodymium, praseodymium, cerium, or a mixed-valence transition element such as iron and part of the selenium or tellurium may be replaced with sulfur or oxygen. And selenium and tellurium may partially replace one another and gadolinium and erbium may partially replace one another. To avoid changing the essential nature of a composition of the invention, the principal rare-earth metal is generally replaced with less than about 5 atomic percent of other metal, preferably less than 2 atomic percent of other metal, though larger amounts of some metals have been used and good properties obtained (neodymium, for example, has replaced up to 50 atomic percent of the rare-earth metal); and generally less than about 5 atomic percent of the chalcogen is replaced. A primary reason for use of the substituent elements is to modify the electronic properties of the resulting composition or to add scattering sites to reduce thermal conductivity. Impurity promoting agents may also be used in very small amounts to adjust the properties of the composition.

Ingredients of semiconductor purity are desirably used in manufacture of compositions of the invention. However, several different kinds of foreign impurities may be found in rare-earth metals, and satisfactory compositions of the invention have been made using ingredients having the following typical impurities (amounts are in weight-percent and were determined by emission spectroscopy and semiquantitative analysis): iron, 0.002 to 2.78; silicon, 0.003; nickel, 0.008; magnesium, 0.005 to 0.01; calcium, 0.005 to 0.007; aluminum, 0.005 to less than 0.01; oxygen, 0.160 to 0.415; europium, less than 0.005; terbium, less than 0.01; dysprosium, less than 0.01; yttrium, 0.5; samarium, less than 0.01; tantalum, 0.05 to 0.3; ytterbium, less than 0.01.

The invention is further illustrated by the following examples.

EXAMPLE 1

Gadolinium turnings in an amount of 5.7039 parts by weight and 4.2961 parts of selenium particles (providing an atomic ratio of 2 parts gadolinium to 3 parts selenium) were mixed under a nonoxidizing atmosphere in a carbon crucible with a spatula. The gadolinium turnings had been received and stored under a nonoxidizing atmosphere and the mixing was performed under conditions that minimized oxidation of the metal. The crucible and its cntents were placed in a round-bottom quartz tube, after which the tube was evacuated for two hours, then flushed three times with carbon dioxide gas, and then sealed under carbon dioxide gas at a pressure of ½ pound per square inch absolute. The sealed quartz tube was placed in an electric furnace, and the ingredients heated slowly to 220° C, held at that temperature for approximately ½ hour, then heated to 540° C and held at that temperature for 15 hours, then heated to 680° C and held at that temperature for ½ hour, then to 1050° C and held 1 hour, and then to 1160° C and held ½ hour. The furnace was then turned off and the sample allowed to cool to room temperature.

The sealed tube was removed from the furnace, broken, and the product of this low-temperature reaction procedure examined. The product was a single clinker-like specimen and not an ingot formed by melting of all the contents. The clinker-like product was placed in a vitreous carbon crucible, which was then placed in a high-temperature carbon-tube furnace and the furnace filled with a static helium atmosphere. The temperature of the product of the low-temperature reaction was then elevated to approximately 2000° C over a period of about 3 hours, the temperature being monitored by an optical pyrometer. At that temperature the product had melted, and after holding the melt at 2000° C for approximately ½ hour, the furnace was turned off and the sample cooled to room temperature.

The reacted ingot was crushed and placed in a ¼-inch-diameter cylindrical recess in a carbon crucible, and the crucible inserted in the high-temperature carbon tube furnace under a static helium atmosphere where the powder was heated to about 2000° C and melted. The melt was then cooled to form a right circular cylinder about one inch long that although dense exhibited some pores or voids because of gas entrapment.

When observed under a microscope at about 300 times magnification, very small and incomplete grain boundaries of a possible second phase material could be observed. To determine the composition of the bulk phase, several electron microprobe measurements, which are accurate to within about ± 15% of the weight of the individual ingredients, were made and averaged. By this method the ratio of selenium to gadolinium in the principal phase was measured as 1.49 to 1, while the grain boundary phase was too small for measurement.

Electrical properties of the cast composition were then measured with the following results obtained.

| Temperatures of measurement (° C) | Absolute Seebeck coefficient (microvolts/° C) | Resistivity (milliohm-centimeters) |
|---|---|---|
| 300 | 221 | 6.1 |
| 400 | 249 | 7.3 |
| 500 | 273 | 8.4 |
| 600 | 292 | 9.4 |
| 700 | 302 | 10.2 |
| 800 | 310 | 10.7 |

To illustrate the similarity between these values and the described P-type copper and copper-silver chalcogenides, representative values for copper-silver selenide (including about 65.57 atomic percent copper, 1.00 atomic percent silver, and 33.43 atomic percent selenium) are as follows:

| Temperature of measurement (° C) | Absolute Seebeck coefficient (microvolts/° C) | Resistivity (milliohm-centimeters) |
|---|---|---|
| 300 | 191 | 4.4 |
| 400 | 221 | 5.8 |
| 500 | 249 | 7.3 |
| 600 | 270 | 8.9 |
| 700 | 285 | 10.3 |
| 800 | 291 | 11.4 |

The N-type gadolinium selenide of this example was observed to be an extrinsic conductor to very high temperatures (above 1000° C). The material was also observed to oxidize readily and special precautions on handling and measurment were necessary. The thermal conductivity of the material was indicated to be low, and on the order of that for the described P-type compositions, by feeling the cylinder when it was in a thermal gradient and by observartion of the differences in time for measurements of Seebeck coefficient at different points on a leg to reach their maximum. The material was strong enough to resist flexure by hand and appeared to be harder and less ductile than the described P-type compositions.

EXAMPLE 2

Gadolinium metal turnings in an amount of 9.6366 parts by weight and 7.1570 parts of selenium shot (providing an atomic ratio of 2.03 parts gadolinium and 3 parts selenium) were weighed into a vitreous carbon crucible under nonoxidizing conditions, after which the crucible was placed in a quartz tube, and the tube evacuated, filled with carbon dioxide at a pressure of ½-pound per square inch absolute, and sealed. The sealed tubes were placed in an electric furnace and heated over a period of 3 days to 1000° C, with overnight temperature soaks at 220°, 680°, and 1000° C. The clinker-like product of this set of low-temperature reactions was allowed to cool to room temperature, the crucible removed from the sealed tube, and then the crucible and clinker-like product placed in a carbon tube furnace and heated to approximately 1900° C under a static helium atmosphere, where the product melted. The melt was maintained for approximately 30 minutes, and then the furance cooled to room temperature. The resulting product was ground, placed in a carbon mold, and cast as a right circular cylinder using a carbon tube furnace, and a static helium atmosphere.

The overall composition of the cylinder was analyzed by an oxidation-gravimetric method in which gadolinium selenide is oxidized according to the following equation to effect a clean separation of the gadolinium cation and selenium;

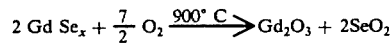

$$2 \, Gd \, Se_x + \frac{7}{2} O_2 \xrightarrow{900° C} Gd_2O_3 + 2SeO_2$$

The amount of gadolinium in the gadolinium selenide is calculated from the amount of gadolinium oxide obtained, and by this analysis it was found that the ratio of chalcogen to metal in the cylinder as a whole was about 1.42 to 1. Other elements were present in only trace amounts and constituted less than 0.1 weight-percent of the whole sample.

The sample was examined metallographically and the alloy phases present in the sample were examined by the electron microprobe. The results of these analyses indicated that the sample was two-phase with a bulk phase occupying approximately 97 percent of the surface area of a sample and having a nominal composition of $GdSe_{1.45}$ and an intergranular phase having a nominal composition of $GdSe_{1.0-1.2}$. The sample was porous throughout with the highest concentration of pores located near the center of the sample.

The Seebeck coefficient and electrical resistivity of this sample were as follows (as a result of the porosity of the sample and the rather large amount of second phase, the resistivity measurements for this sample may be high):

| Temperature of measurement (° C) | Absolute Seebeck coefficient (microvols/° C) | Resistivity (milliohm-centimeters) |
|---|---|---|
| 200 | 115 | 5.1 |
| 300 | 138 | 6.1 |
| 400 | 166 | 7.0 |
| 500 | 189 | 8.0 |
| 600 | 212 | 9.0 |
| 700 | 232 | 10.0 |
| 800 | 251 | 11.0 |

EXAMPLE 3

Erbium turnings in an amount of 9.3269 parts by weight and 10.6732 parts of tellurium particles were placed in a bakedout carbon crucible, after which the crucible was placed in a quartz tube, the tube evacuated and flushed with carbon dioxide three times, carbon dioxide under a pressure of ½ pound per square inch fed into the tube, and the tube sealed. The sealed tube was placed in an electric furnace, where the ingredients were heated slowly (about 1°-2° C per minute) to the melting point of tellurium, 450° C, held at that temperature for approximately 18 hours, and then heated to 1000° C at a rate of about 65° C per hour and held at that temperature for 18 hours. Next, the ingredients were heated to about 1230° C at an overall rate of about 3° C per hour, with the temperature held at 1035° C, 1081° C, 1140° C, 1175° C, and 1230° C each for approximately ¾ hour. After being held at 1230° C for 1 hour, the composition was cooled to room temperature.

The sealed tube was removed from the furnace, broken, and the resulting clinker-like product placed in a vitreous carbon crucible. The crucible and product were placed in a high-temperature carbon-tube furnace under a static helium atmosphere and the product heated to approximately 2000° C over a period of about 4 hours. At that temperature the product had melted, and after holding the melt at 2000° C for approximately ½ hour, the furnace was turned off and the sample cooled to room temperature at a rate of about 10° C per minute. The resulting reacted ingot was crushed and cast as a somewhat porous ½-inch-diameter right circular cylinder in a carbon crucible and carbon-tube furnace.

The electrical resistivity of the material at room temperature was about 1.1 milliohm-centimeter and the Seebeck coefficient was as follows:

| Temperature of measurement (° C) | Absolute Seebeck coefficient (microvolts/° C) |
|---|---|
| 200 | 119 |
| 300 | 134 |
| 400 | 159 |
| 500 | 175 |
| 600 | 188 |
| 700 | 200 |

What is claimed is:

1. In a thermoelectric generator, an N-type thermoelectric leg, at least part of the length of which consists essentially of a defect-doped, mixed-valence, N-type thermoelectric composition that exhibits a negative absolute Seebeck coefficient of at least 175 microvolts/°C. and consists essentially of rare-earth metal selected from gadolinium and erbium and chalcogen selected from selenium and tellurium, with from 0 to about 5 atomic-percent of the metal being replaced with cerium, neodymium, praseodymium, yttrium, or a mixed-valence transition element and with from 0 to about 5 atomic percent of the chalcogen being replaced with sulfur or oxygen, and the ratio of chalcogen elements to metal elements being between 1.47 and slightly less than 1.5 to 1; at least about 99 area-percent of said composition being a single phase.

2. A thermoelectric generator of claim 1 in which the rare-earth metal consists essentially of gadolinium.

3. A thermoelectric generator of claim 1 in which said composition consists essentially of gadolinium and selenium.

4. A thermoelectric generator of claim 1 that includes a P-type thermoelectric leg that consists essentially of at least one metal ingredient selected from copper and a mixture of copper and silver, and at least one non-metal element selected from tellurium and selenium.

5. In a thermoelectric generator, a N-type thermoelectric leg, at least part of the length of which consists essentially of a defect-doped, mixed-valence, N-type thermoelectric composition that exhibits a negative absolute Seebeck coefficient of at least 175 microvolts/°C. at 500° C and consists essentially of gadolinium and selenium, with from 0 to about 5 atomic-percent of the gadolinium being replaced with iron, and the ratio of chalcogen elements to metal elements being between 1.47 and slightly less than 1.5 to 1; at least about 99 area-percent of said composition being a single phase.

* * * * *